United States Patent [19]

Monteyne

[11] Patent Number: 4,518,498
[45] Date of Patent: May 21, 1985

[54] METALLURGICAL SLAG FILTERING APPARATUS WHICH EFFECTS UNIFORM CHARGING OF A CONVEYER BELT

[75] Inventor: Guido Monteyne, Lembeke, Belgium

[73] Assignee: Paul Wurth S.A., Luxembourg, Luxembourg

[21] Appl. No.: 578,816

[22] Filed: Feb. 10, 1984

[30] Foreign Application Priority Data

Feb. 10, 1983 [LU] Luxembourg ............... 84644

[51] Int. Cl.³ .................................... B01D 33/06
[52] U.S. Cl. .................... 210/297; 210/394; 210/403; 65/19; 65/141; 209/155; 198/509; 198/525; 198/714
[58] Field of Search ................ 65/19, 20, 141; 210/372, 374, 394, 297, 307, 402, 403, 404; 198/509, 525, 560, 612, 713, 714, 836; 209/155, 452, 482

[56] References Cited

U.S. PATENT DOCUMENTS

| 721,890 | 3/1903 | Henius | 210/403 |
|---|---|---|---|
| 1,712,258 | 5/1929 | Compain | 210/394 |
| 2,278,730 | 4/1942 | Neuman | 198/525 |
| 2,664,204 | 12/1953 | Hurter | 210/403 |
| 2,765,915 | 10/1956 | Nilsson | 210/403 |
| 3,014,589 | 12/1961 | Frykhult | 210/404 |
| 3,171,534 | 3/1965 | Oury | 198/525 |
| 3,399,466 | 9/1968 | Hartley | 198/525 |
| 3,612,246 | 10/1971 | Elze | 198/509 |
| 4,062,776 | 12/1977 | Blok | 210/403 |
| 4,204,855 | 5/1980 | Monteyne | 210/394 |
| 4,236,628 | 12/1980 | Stahura | 198/525 |
| 4,392,949 | 7/1983 | Kruyer | 210/403 |

FOREIGN PATENT DOCUMENTS 280260 8/1913 Fed. Rep. of Germany ...... 210/403

Primary Examiner—Ernest G. Therkorn
Attorney, Agent, or Firm—Fishman & Dionne

[57] ABSTRACT

A filtration apparatus comprised of a rotary drum having a plurality of internal vanes for conveying slag material is presented. The slag is conveyed upwardly by the vanes, after which is falls freely onto a conveyer belt passing longitudinally through the drum. Deflectors guide the slag during its fall onto the belt. The deflectors are divergent and inclined relative to the direction of movement of the conveyer belt. The rotatable drum is axially subdivided into a plurality of sections, the vanes of each section being angularly offset in relation to the vanes of adjacent sections. The filtering apparatus herein effects uniform charging of slag material onto the conveyer belt.

2 Claims, 3 Drawing Figures

METALLURGICAL SLAG FILTERING APPARATUS WHICH EFFECTS UNIFORM CHARGING OF A CONVEYER BELT

BACKGROUND OF THE INVENTION

This invention relates to apparatus for filtering metallurgical slag. More particularly, this invention relates to a new and improved filtering drum used in conjunction with a metallurgical slag filtering apparatus which uniformly charges a belt used for conveying granulated slag material therefrom. The general type of filtering apparatus to which the invention is directed was disclosed in my earlier U.S. Pat. No. 4,204,855, of which all of the disclosure is incorporated herein by reference. This application presents an improved drum construction for the filtering apparatus of U.S. Pat. No. 4,204,855. Other improved features are disclosed in my U.S. application Ser. Nos. 578,817 and 578,818, now U.S. Pat. No. 4,477,349 and U.S. Pat. No. 4,493,767, respectively, all of the contents of which are incorporated herein by reference thereto.

The filtration apparatus of the type herein above discussed comprise a substantially horizontal rotary drum having filtering screens or foraminous walls along the outside surface thereof and being provided with internal vanes along the inside surface thereof for conveying metallurgical granulated slag material upwardly. Thereafter, the filtered slag falls freely onto a conveyer belt passing longitudinally through the drum. A filtering apparatus of this type will also include a feed channel through which the pulp, i.e., granulated slag and water, is fed into the drum.

In a filtration apparatus of this type, the metallurgical slag is discharged from each vane at a certain height above the conveyer belt. As a result, after a vane has discharged its contents, i.e., filtered slag, a particular time period will lapse before a subsequent vane reaches the discharge level or discharge height of the rotary drum. Consequently, piles of granulated slag will form along the length of the conveyer belt which is continually removing the slag from the rotary drum. The conveyer belt therefore, is subjected to uneven stresses and to greater wear at certain portions thereof, than if the belt were to be charged in a uniform manner.

A further problem of this uneven or nonuniform belt charging process is that the conveyer belt may deviate from its desired path as a result of the uneven distribution and therefore suffer even further damage.

A third problem with the present method of charging the conveyer belt is that the belt must be manufactured larger (i.e., wider) than is otherwise necessary. In other words, the conveyer belt must be manufactured to oversized dimensions, thereby incurring greater costs.

In view of the above discussion, it would be advantageous to alter the filtration apparatus as disclosed in my earlier U.S. Pat. No. 4,204,855 so that the conveyer belt will be subjected to uniform loading both along the length and width thereof.

SUMMARY OF THE INVENTION

The above discussed and other problems are overcome or alleviated by the filtration drum apparatus which effects uniform charging of a conveyer belt of the present invention. In accordance with the present invention, a novel and improved internal vane arrangement is incorporated into a rotary drum used in a metallurgical slag filtration apparatus.

The apparatus in accordance with the present invention comprises a substantially horizontal rotary drum having a generally cylindrical outer foraminous wall or screen type filtering wall. The rotary drum is provided with a plurality of vanes along the inner side of the cylindrical wall, the vanes being suitable for conveying granulated slag material upwardly. Thereafter, the filtered slag is discharged by falling freely onto a conveyer belt passing longitudinally through the drum. Each vane is associated with deflector means which act to guide the slag during its fall onto the conveyer belt. The rotary drum is axially subdivided into a plurality of sections. In accordance with the present invention, the particular blades disposed in each section of the drum are angularly offset in relation to the vanes of an adjacent section; and the lower edges of the deflection diverge whereby each of the deflectors is inclined relative to the direction of the movement of the conveyer belt.

The incline of the lower edge of each of the deflectors is preferably such that the longitudinal aperture defined between the deflectors and above the conveyer belt will diverge in the direction in which the conveyer belt is moving.

The above discussed and other advantages of the present invention will be apparent to and understood by those skilled in the art from the following detailed description and drawings.

DESCRIPTION OF THE DRAWINGS

Referring now to the drawings wherein like elements are numbered alike in the several figures.

DESCRIPTION OF THE PREFERRED EMBODIMENT

Figure 1:
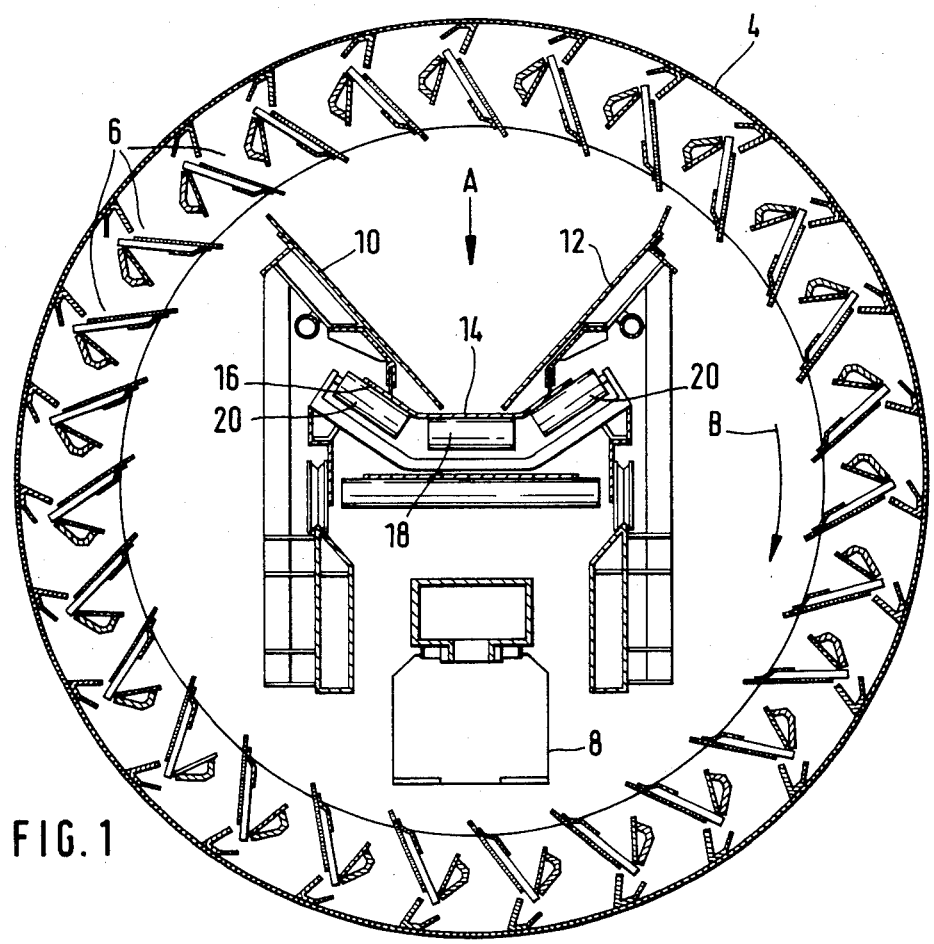
FIG. 1 is a cross sectional elevation view of a filtration apparatus in accordance with the present invention.

Referring first to FIG. 1, the filtration apparatus shown therein is of the general type described in the previously mentioned U.S. Pat. No. 4,204,855 and therefore, similar or identical structural details will not be described herein. Accordingly, reference should be made to the U.S. patent for this type of information.

In FIG. 1, a rotary drum is shown generally at 4. The outer surface of drum 4 consists of a wire filtration screen or other foraminous wall having a plurality of filtration vanes 6 on the interior thereof. Filtering vanes 6 are similarly comprised, in part, of a foraminous material so as to allow water to flow therethrough. The drum 4 rotates in the direction indicated by the arrow B so that the pulp, i.e. water having granulated slag therein and having been supplied to the drum through a pipe 8 inside the drum 4, is conveyed upwardly by the vanes 6. The water/granulated slag pulp mixture will pass through the filtering surfaces of the drum 4 and of the vanes 6. As a result, the granulated slag will be separated from the water solution as the slag is conveyed upwardly by the vanes 6. As the freed slag approaches the upper portion of the drum 4, the slag will be discharged by the vanes 6 and deflected by the longitudinal deflectors 10 and 12 onto a conveyer belt 14 thereby permitting the granulated slag to be continuously removed from the drum 4.

Still referring to FIG. 1, the two longitudinal side portions 16 of the conveyer belt 14 are inclined upwardly, the inclined walls being supported by slanting rollers 20. The central longitudinal portion of the belt 14 has a horizontal orientation and is therefor supported by horizontal rollers 18.

In order to guide the granulated slag material onto the flat central portion of the belt 14, the deflectors 10 and 12 must be sufficiently long, i.e. their respective lower edges must extend almost onto the middle of the belt. However, if this particular structure is utilized, then only the middle portion of the conveyer belt 14 would be charged with slag, while the longitudinal side portions (i.e. those portions at or near the part supported by the cylinders 20) would remain empty. Moreover, the distance between the deflectors at their bottom edges would be inadequate so that a undesirable "bridge" might be formed thereby impeding the descent of the slag onto the belt.

Figure 2:
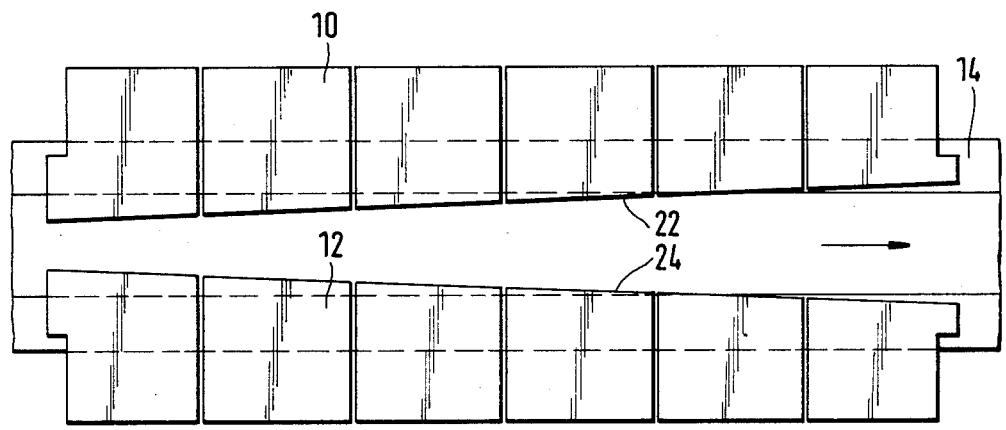
FIG. 2 is a plan view of the conveyer belt, looking from the direction indicated by arrow A in FIG. 1.

The apparatus of the present invention overcomes the above discussed problems by constructing the lower edges 22 and 24 of the deflectors 10 and 12 so as to slant or diverge as shown in FIG. 2. By utilizing this structure, the aperture defined between the edges 22 and 24 above the conveyer belt 14 will diverge in the direction in which the conveyer belt moves thereby effecting a desirable widening of the slag discharge zone.

Figure 3:
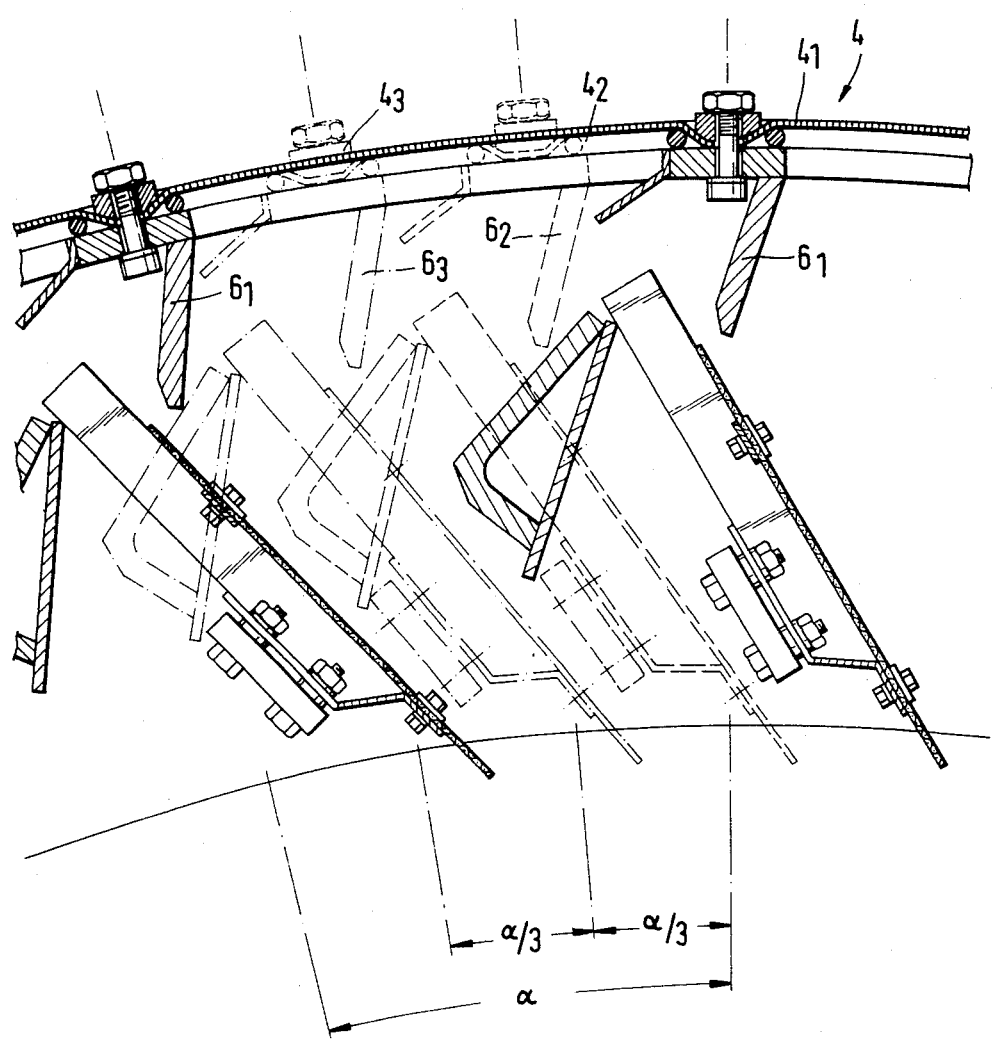
FIG. 3 is an enlarged view, partially in cross section, of two vane portions from FIG. 1.

In another important feature of the present invention, the rotatable drum 4 is axially subdivided into juxtaposed sections (three being shown in FIG. 1) which are marked $4_1$ (in full lines), $4_2$ (in broken lines), and $4_3$ (in dot and dashed lines) in FIG. 3. In order to provide uniform charging over the length of the conveyer belt 14, the vanes of the different sections $4_1$, $4_2$ and $4_3$ are angularly offset relative to the vanes of an adjacent section. Thus, as shown in FIG. 3, the vane blades $6_1$ of the section $4_1$ are angularly offset in relation to the vane blades $6_2$ of the section $4_2$. Note that blade $6_2$ is itself offset in the angular direction relative to the blade $6_3$ of the section $4_3$. If the particular angle between to successive vanes in one section is equal to the angle $\alpha$, then the angular offsets $6_1$-$6_2$, $6_2$-$6_3$ and $6_3$-$6_1$ between the corresponding vanes of two adjacent sections should preferably be equal to about $\alpha/3$.

The distribution of the slag on the conveyer belt 14 may be further controlled to some extent by making the longitudinal deflectors 10 and 12 adjustable either in their angle of inclination or deviation, on in their width or in their height.

Accordingly, it is clear from the above discussion that the inclined deflectors 10 and 12 and offset of the vanes 6 will combine to provide a uniformed discharge onto the conveyer belt, in as much as the deflectors 10,12 will render the discharge rate equal over the entire width of the belt, while the angular offset of the vanes 6 will result in uniform discharge over the entire length of the belt.

If necessary or desired, the results of the deflectors 10,12 may be enhanced by providing one or more central deflectors (not shown). A central deflector of this type would have the shape of a circumflex accent or other suitable shape and would be located between the two deflectors 10,12 so as to prevent a direct or "on center" fall of the slag onto the belt 14.

It will be understood to those skilled in the art that the axial subdivision of the rotary drum 4 into three sections is by way of example only. Obviously, the divisions of the rotary drum 4 into sections may be greater than or fewer than three and will depend, in part, on the length of the drum.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. Filtration apparatus including a rotary drum, said drum having foraminous walls along the outside surface thereof, said rotary drum having a plurality of internal vanes for filtering liquid and solid materials, said filtered solid material being conveyed upwardly and subsequently falling onto a conveyer belt passing longitudinally through the drum, said filtration apparatus further including:
    at least a pair of deflector means, said deflector means being disposed above said conveyor belt and extending in the direction of travel of said conveyor belt;
    said pair of deflector means defining a space therebetween wherein said filtered solid material is guided onto said belt;
    at least part of said deflector means diverging in the direction of the movement of said conveyor belt; and
    said rotary drum being divided into a plurality of sections, each of said sections having plural vanes therein, wherein said vanes of each of said sections are angularly offset relative to said vanes of adjacent sections.

2. The apparatus of claim 1 wherein:
    said rotary drum is divided into three sections and wherein the angular offset of the vanes of a first section relative to the vanes of a second section is equal to $\frac{1}{3}$ the angular offset between two successive vanes in said first section.

* * * * *